(12) United States Patent
Coffin et al.

(10) Patent No.: US 10,670,462 B2
(45) Date of Patent: Jun. 2, 2020

(54) SYSTEM AND METHOD FOR AN INTERFEROMETER RESISTANT TO EXTERNALLY APPLIED FORCES

(71) Applicant: THERMO ELECTRON SCIENTIFIC INSTRUMENTS LLC, Madison, WI (US)

(72) Inventors: John Magie Coffin, Madison, WI (US); Michael S. Georgiadis, Madison, WI (US); Jei Y. Chou, Madison, WI (US)

(73) Assignee: THERMO ELECTRON SCIENTIFIC INSTRUMENTS LLC, Madison, WI (US)

( * ) Notice: Subject to any disclaimer, the term of this patent is extended or adjusted under 35 U.S.C. 154(b) by 59 days.

(21) Appl. No.: 15/920,999

(22) Filed: Mar. 14, 2018

(65) Prior Publication Data
US 2018/0266882 A1 Sep. 20, 2018

Related U.S. Application Data

(60) Provisional application No. 62/472,096, filed on Mar. 16, 2017.

(51) Int. Cl.
*G01J 3/453* (2006.01)
*G01J 3/02* (2006.01)
(Continued)

(52) U.S. Cl.
CPC .......... *G01J 3/4535* (2013.01); *G01J 3/0202* (2013.01); *G01J 3/0289* (2013.01); *G01J 3/0297* (2013.01);
(Continued)

(58) Field of Classification Search
CPC ...... G01J 3/0275; G01J 3/0202; G01J 3/0297; G01J 3/06; G01J 3/027; G01J 3/0289;
(Continued)

(56) References Cited

U.S. PATENT DOCUMENTS 3,535,024 A 10/1970 Webb
4,480,914 A * 11/1984 Thompson ............. G02B 26/08
356/452
(Continued)

FOREIGN PATENT DOCUMENTS

JP 2013213721 A 10/2013

OTHER PUBLICATIONS

Deng et al., "Fourier Spectrometer based on a wide-range and nanometer stabilized Michelson Interferometer," Advances in Optoelectronics and Micro/Nano-Optics (AOM), 2010 OSA-IEEE-COS, Dec. 3, 2010, 6 pgs.
(Continued)

*Primary Examiner* — Michael P LaPage
(74) *Attorney, Agent, or Firm* — William R. McCarthy, III

(57) ABSTRACT

An embodiment of a ruggedized interferometer is described that comprises a light source that generates a beam of light; a fixed mirror; a moving mirror that travels along a linear path; a beam splitter that directs a first portion of the beam of light to the fixed mirror and a second portion of the beam of light to the moving mirror, wherein the beam splitter recombines the first portion reflected from the fixed mirror and the second portion reflected from the moving mirror; and a servo control that applies a substantial degree of force to the moving mirror at initiation of a turnaround period, wherein the substantial degree of force is sufficient to redirect the moving mirror traveling at a high velocity to an opposite direction of travel on the linear path.

24 Claims, 7 Drawing Sheets

(51) Int. Cl.
  *G01J 3/06* (2006.01)
  *H02P 25/034* (2016.01)
  *H02P 8/00* (2006.01)

(52) U.S. Cl.
  CPC .............. *G01J 3/06* (2013.01); *H02P 25/034* (2016.02); *G01J 2003/4538* (2013.01); *H02P 8/00* (2013.01)

(58) Field of Classification Search
  CPC ............ G01J 3/4535; G01J 2003/4538; H02P 25/034; H02P 8/00; G01B 9/02052; G01B 9/02076; G01B 9/02077
  See application file for complete search history.

(56) References Cited

U.S. PATENT DOCUMENTS

| | | | | |
|---|---|---|---|---|
| 5,592,292 | A * | 1/1997 | Nanko | G01J 3/4535 356/452 |
| 5,768,137 | A | 6/1998 | Polidoro et al. | |
| 5,898,495 | A * | 4/1999 | Manning | G01J 3/02 250/339.07 |
| 2013/0201634 | A1* | 8/2013 | Im | C30B 1/08 361/748 |
| 2013/0335737 | A1* | 12/2013 | Stein | G01J 3/06 356/326 |
| 2014/0125985 | A1* | 5/2014 | Justice | G01J 3/0202 356/456 |
| 2016/0131528 | A1 | 5/2016 | Ando | |
| 2017/0343415 | A1* | 11/2017 | Suess | G01J 3/021 |

OTHER PUBLICATIONS

Suarez-Bertoa et al., "Intercomparison of real-time tailpipe ammonia measurements from vehicles tested over the new world-harmonized light-duty vehicle test cycle (WLTC)," Environ Sci Pollut Res, 22, 7450-7460, 2015.

International Preliminary Report on Patentability dated Sep. 17, 2019, to PCT Application No. PCT/US2018/022374.

* cited by examiner

SYSTEM AND METHOD FOR AN INTERFEROMETER RESISTANT TO EXTERNALLY APPLIED FORCES

CROSS-REFERENCE TO RELATED APPLICATION

This application claims the benefit of U.S. provisional patent application No. 62/472,096, filed Mar. 16, 2017. The content of this application is incorporated by reference in its entirety.

FIELD OF THE INVENTION

The present invention is generally directed to an improved interferometer and method of operation.

BACKGROUND

It is generally appreciated that Fourier Transform Infra Red (FTIR) Spectroscopy techniques provide excellent tools for measuring the concentrations of a large number (e.g. 20+) gasses simultaneously, in real-time. The term "real-time" as used herein typically refers to reporting, depicting, or reacting to events at the same rate and sometimes at the same time as they unfold, rather than delaying a report or action. Because of this FTIR has been an important technology for emissions monitoring industries, however there have been challenges to reliably use FTIR for certain portable or industrial applications in environments that produce forces that interfere with FTIR performance. One example of which includes a system to measure emissions of a vehicle in real-time while the vehicle is in motion and subject to forces acting on the instrument that may include vibrations, an aspect change of an instrument relative to gravity (e.g. tilt), change in momentum (e.g. acceleration/deceleration), etc. A specific example of such a system may be referred to as PEMS (portable emissions measurement system) for RDE (Real-Time Driving Emissions).

Those of ordinary skill understand that "interferometer" instruments that utilize FTIR technology typically include what is referred to as a modulator that can be extremely sensitive to vibrations, tilts, and other similar conditions. For example some interferometer embodiments are particularly susceptible to externally applied forces which can result in 1) introduction of aberrations into the data, yielding poor data quality; and/or 2) upset of the control system of the interferometer, causing it to stop scanning temporarily, yielding no data for several seconds. In some cases the externally applied forces could also prevent the instrument from starting to scan from a stopped or off position.

For a continuous measurement system, such as PEMS, it is extremely desirable for the interferometer to produce substantially uninterrupted data (e.g. as few data dropouts as possible) and of substantially equal quality to that which could be obtained in a laboratory environment. One particular type of interferometer, referred to as a "Michelson interferometer" can be configured in a cost effective and compact form desirable for PEMS applications, however Michelson interferometer embodiments typically suffer from issues that result from externally applied forces as described above. For example, a Michelson interferometer works by using a Beamsplitter to reflect and transmit incoming light. One beam path of light reflects off of a stationary mirror, and the other beam path of light reflects off of a moving mirror. These two beams recombine at the Beamsplitter and exit the interferometer. As the moving mirror oscillates back and forth, interference patterns between the two light beams create a modulated signal. This modulated light signal then interacts with a sample, and is finally measured by a detector. In addition, a laser beam of a fixed, known frequency is passed through the interferometer and detected with a separate detector. This laser signal is used to sample the modulated light at a known position spacing (e.g. 1 divided by the frequency of the laser), and the laser signal is also used to control the velocity of the moving mirror through a servo motor. This measured signal in position space is Fourier transformed, resulting in a spectrum in frequency space. Additional description of Michelson interferometers are discussed in "Fourier Transform Infrared Spectroscopy" by Griffiths and de Haseth (Griffiths, Peter R., and James A. De Haseth. Fourier Transform Infrared Spectroscopy. 2nd ed. Hoboken, N.J.: John Wiley & Sons, 2007), which is hereby incorporated by reference herein in its entirety for all purposes.

Those of ordinary skill in the related art appreciate that Michelson interferometer embodiments are very precise instruments and usually incorporate one or more mechanisms to address variations that can occur through physical and/or environmental fluctuations. For example, some embodiments include a dynamic alignment system that tilts the stationary mirror to account for minor misalignments in the interferometer, as well as to account for thermal drift of the interferometer. The dynamic alignment system typically has its own control system separate from the servo motor control system that controls the moving mirror. Both the dynamic alignment and servo motor control systems use the laser signal as the measurement, but in different ways. The moving mirror servo motor control system uses what are referred to as "zero-crossings" of the laser as a measurement of the velocity of the moving mirror. The dynamic alignment system typically uses three separate laser signals separated in the plane of the beam, and uses a control system to lock the phases of the three laser signals in place to some defined phase separation. Minor misalignments in the interferometer normally cause the phase separations of these laser signals to vary throughout the oscillations of the moving mirror. This well-known technique for Michelson Interferometers is described further in standard texts, such as *Fourier Transform Infrared Spectroscopy* by Griffiths and de Haseth, incorporated by reference above.

However, as described above even with the mechanisms that address physical and/or environmental variations typical Michelson interferometer embodiments do not address significant effects caused by externally applied forces such as, for example, those experienced in portable applications (e.g. for vehicles that include cars, trucks, aviation, etc.) or industrial applications (e.g. power plants or remote emissions monitoring stations with large fans or other devices that cause large vibrations). Further, it is very challenging to develop a Michelson interferometer embodiment that addresses substantial effects caused by externally applied forces in a simple and cost effective manner. For example, those of ordinary skill in the art appreciate that technologies that include what may be referred to as "Quadrature" technologies exist that could address some effects caused by externally applied forces. However, the level of complexity and cost associated with such technologies is prohibitive to portable and industrial applications.

Therefore, there is a need for an improved design of an interferometer that makes it more resistant to externally applied forces in a relatively simple and inexpensive manner.

SUMMARY

Systems, methods, and products to address these and other needs are described herein with respect to illustrative, non-limiting, implementations. Various alternatives, modifications and equivalents are possible.

An embodiment of a ruggedized interferometer is described that comprises a light source that generates a beam of light; a fixed mirror; a moving mirror that travels along a linear path; a beam splitter that directs a first portion of the beam of light to the fixed mirror and a second portion of the beam of light to the moving mirror, where the beam splitter recombines the first portion reflected from the fixed mirror and the second portion reflected from the moving mirror; and a servo control that applies a substantial degree of force to the moving mirror at initiation of a turnaround period, wherein the substantial degree of force is sufficient to redirect the moving mirror traveling at a high velocity to an opposite direction of travel on the linear path.

In some embodiments, the initiation of the turnaround period uses an open loop control scheme to apply the substantial degree of force. Also, the servo control applies a force to the moving mirror in a steady state mode using a closed loop control scheme.

Also, the fixed mirror of some embodiments includes a dynamic alignment system that has one or more tuning elements with rigid characteristics such as, a piezo or mechanical actuator. Further some embodiments of a dynamic alignment system also include a coarse tuning mechanism with rigid characteristics such as a lead screw or a stepper motor. Advantageously, in combination the tuning elements and coarse tuning mechanism provide an additive range of compensation.

Further, some embodiments of the described invention include a motion detector, such as for instance an accelerometer, positioned on a non-moving portion of the ruggedized interferometer and configured to provide a reference for the moving mirror. In the same or alternative embodiments, a motion detector, which may be the first motion detector or an additional motion detector, is positioned on an end plate and that provides a reference for the tuning elements. Importantly, the motion detector provides information to the servo control to modify the degree of force in the turnaround period.

Each of the described embodiments also include a detector which may be either a "fast" detector (e.g. such as a mercury cadmium telluride (MCT) detector) or "slow" detector (e.g. such as a triglycine sulfate (TGS) detector). Additionally, one or more embodiments may include one or more shock absorbing structures that further reduce the degree of externally applied forces exerted on the components of the ruggedized interferometer. Examples of shock absorbing structures include rubber feet and/or wire rope isolators.

Additionally, in some embodiments the substantial degree of force comprises a force in the range of 50-300 grams that includes a maximum allowable force. In some embodiments, it may be desirable that the substantial degree of force is a force of about 100 grams. Further, the high velocity is greater or equal to 3 cm/s which may include a velocity of about 8.2 cm/s.

The above embodiments and implementations are not necessarily inclusive or exclusive of each other and may be combined in any manner that is non-conflicting and otherwise possible, whether they are presented in association with a same, or a different, embodiment or implementation. The description of one embodiment or implementation is not intended to be limiting with respect to other embodiments and/or implementations. Also, any one or more function, step, operation, or technique described elsewhere in this specification may, in alternative implementations, be combined with any one or more function, step, operation, or technique described in the summary. Thus, the above embodiment and implementations are illustrative rather than limiting.

BRIEF DESCRIPTION OF THE DRAWINGS

The above and further features will be more clearly appreciated from the following detailed description when taken in conjunction with the accompanying drawings. In the drawings, like reference numerals indicate like structures, elements, or method steps and the leftmost digit of a reference numeral indicates the number of the figure in which the references element first appears (for example, element 120 appears first in FIG. 1). All of these conventions, however, are intended to be typical or illustrative, rather than limiting.

Like reference numerals refer to corresponding parts throughout the several views of the drawings.

DETAILED DESCRIPTION OF EMBODIMENTS

As will be described in greater detail below, embodiments of the described invention include an improved interferometer that is resistant to externally applied forces. More specifically, the interferometer is "ruggedized" so that it provides consistent output of high quality data in environments that are subject to externally applied forces such as, for example, environments where a significant degree of vibration, acceleration/momentum change, or tilt is likely. It will be appreciated that the terms vibration, acceleration, momentum change, and tilt all refer to forms of externally applied forces and thus may be used interchangeably herein.

Figure 1:
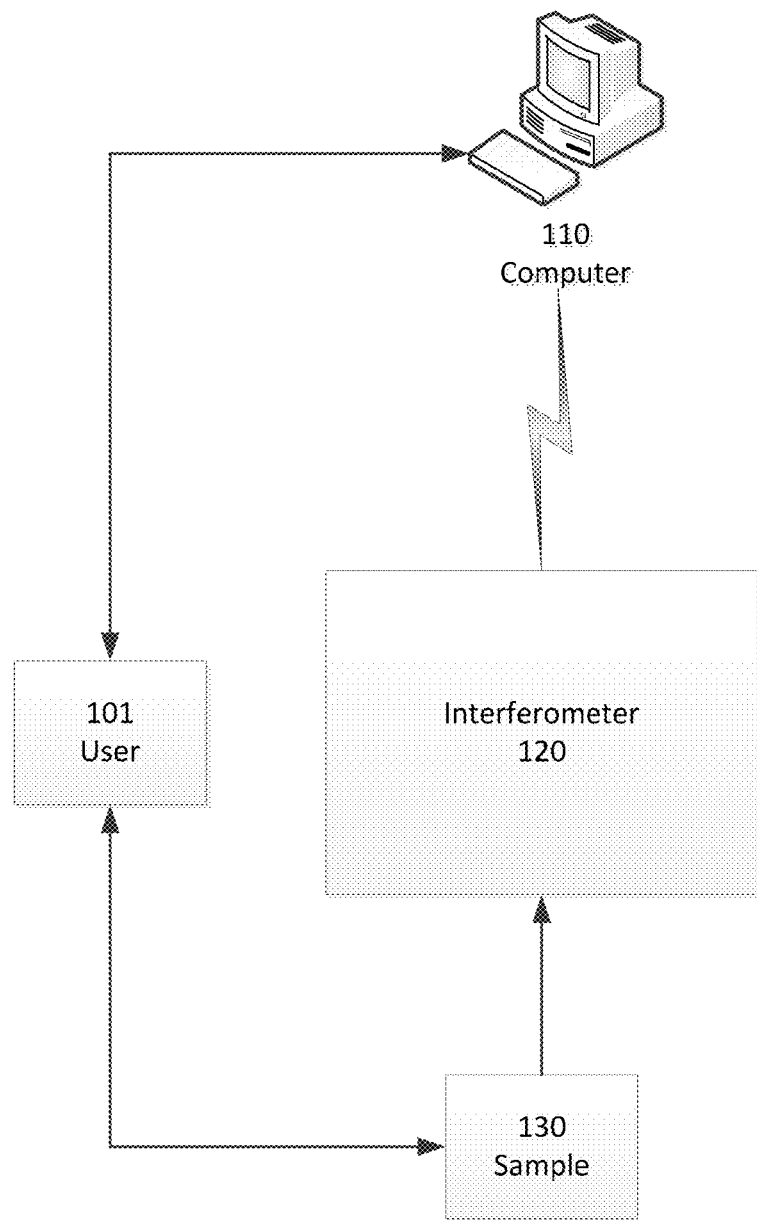
FIG. 1 is a simplified graphical representation of one embodiment of an interferometer and associated computer system.

FIG. 1 provides a simplified illustrative example of user 101 capable of interacting with computer 110, as well as a network connection between computer 110 and interferometer 120. FIG. 1 also illustrates sample 130, which may include a fluid sample (e.g. a gas or a liquid), or solid sample. It will be appreciated that the example of FIG. 1 illustrates a direct network connection between the elements (e.g. including wired or wireless data transmission represented by a lightning bolt), however the exemplary network connection also includes indirect communication via other devices (e.g. switches, routers, controllers, computers, etc.) and therefore should not be considered as limiting.

Computer 110 may include any type of computing platform such as a workstation, a personal computer, a tablet, a "smart phone", a server, compute cluster (local or remote), or any other present or future computer or cluster of computers. Computers typically include known components such as one or more processors, an operating system, system memory, memory storage devices, input-output controllers, input-output devices, and display devices. It will also be appreciated that more than one implementation of computer 110 may be used to carry out various operations in different embodiments, and thus the representation of computer 110 in FIG. 1 should not be considered as limiting.

In some embodiments, computer 110 may employ a computer program product comprising a computer usable medium having control logic (computer software program, including program code) stored therein. The control logic, when executed by a processor, causes the processor to perform functions described herein. In other embodiments, some functions are implemented primarily in hardware using, for example, a hardware state machine. Implementation of the hardware state machine so as to perform the functions described herein will be apparent to those skilled in the relevant arts. Also in the same or other embodiments, computer 110 may employ an internet client that may include specialized software applications enabled to access remote information via a network. A network may include one or more of the many various types of networks well known to those of ordinary skill in the art. For example, a network may include a local or wide area network that employs what is commonly referred to as a TCP/IP protocol suite to communicate. A network may include a network comprising a worldwide system of interconnected computer networks that is commonly referred to as the internet, or could also include various intranet architectures. Those of ordinary skill in the related arts will also appreciate that some users in networked environments may prefer to employ what are generally referred to as "firewalls" (also sometimes referred to as Packet Filters, or Border Protection Devices) to control information traffic to and from hardware and/or software systems. For example, firewalls may comprise hardware or software elements or some combination thereof and are typically designed to enforce security policies put in place by users, such as for instance network administrators, etc.

Figure 2:
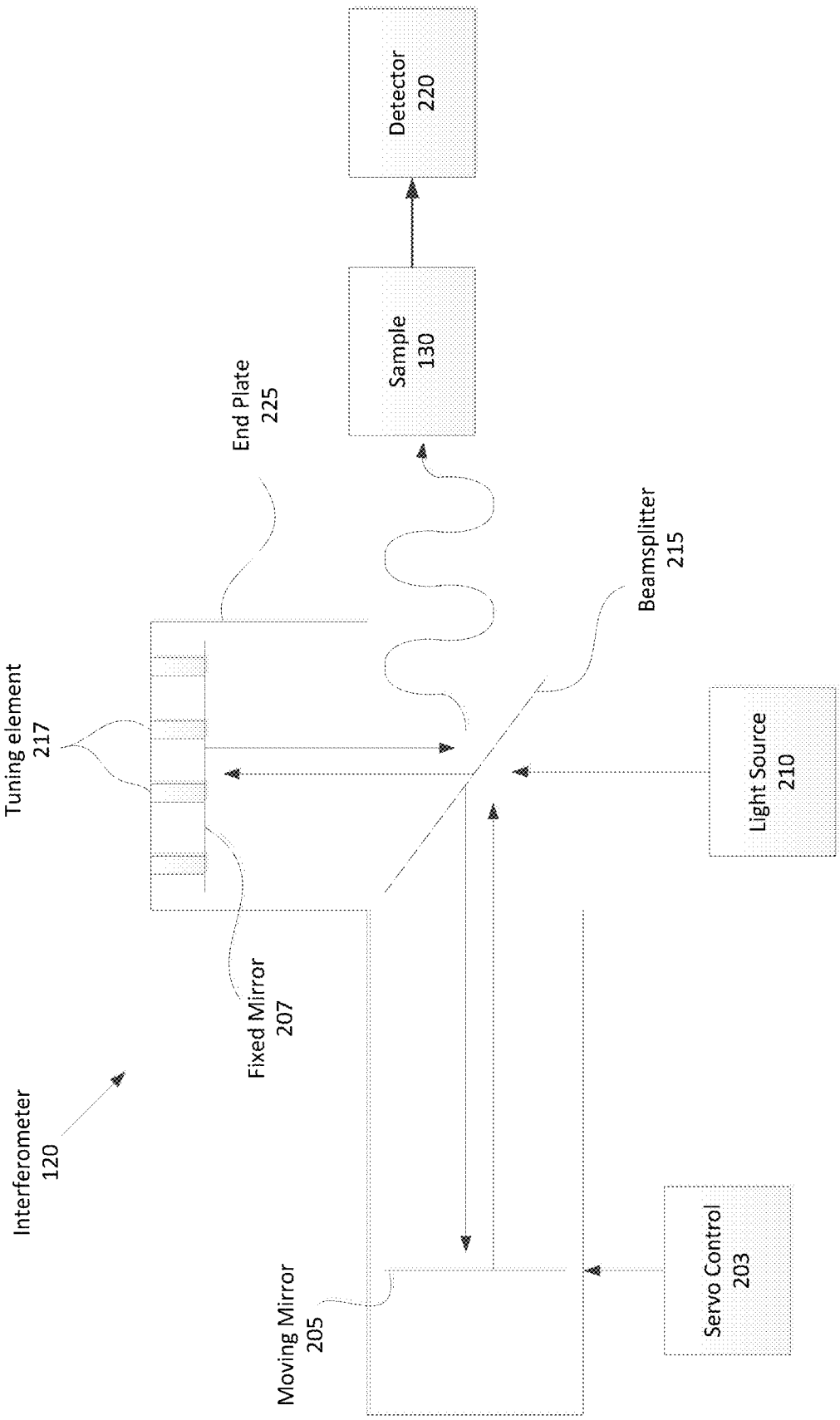
FIG. 2 is a simplified graphical representation of one embodiment of the interferometer of FIG. 1 that comprises a Michelson interferometer configuration.

FIG. 2 provides an illustrative example of an embodiment of a ruggedized (e.g. resistant to externally applied forces) interferometer 120 that includes light source 210 (e.g. a laser), servo control 203, end plate 225, moving mirror 205, and beam splitter 215. FIG. 2 also illustrates detector 220 that measures spectra from a gas sample contained in a "gas cell" and may include what is referred to as a deuterated triglycine sulfate (DTGS) detector, a lithium tantalate (LiTaO$_3$) detector, a triglycine sulfate (TGS) detector, or a mercury cadmium telluride (MCT) detector. It will also be appreciated that interferometer 120 may include elements that are not illustrated in FIG. 2. For example interferometer 120 may be operatively connected to a vehicle, fan, or other source of external force via one or more vibration damping elements such as rubber feet, wire rope isolators, or other shock absorbing structures that reduce and/or remove vibrations that occur at certain frequencies (e.g. the amount of damping at a frequency depends on the characteristics of the vibration damping element).

In the embodiment illustrated in FIG. 2, end plate 225 includes fixed mirror 207 and a dynamic alignment system comprising one or more tuning elements 217 that make positional adjustments to fixed mirror 207. It will be appreciated that tuning elements 217 are illustrated in a linear arrangement in FIG. 2, however tuning elements 217 may be arranged in any configuration and thus the illustration in FIG. 2 should not be considered as limiting. For example, the mounting plane for tuning elements 217 on end plate 225 may comprise a circular shape. Tuning elements 217 may be distributed in any arrangement on the mounting plane that provides all of the desired degrees of freedom of movement for fixed mirror 207 to enable effective dynamic alignment.

In typical embodiments of a Michelson Interferometer the fixed mirror sits on a flexible post that enables the dynamic alignment system to have a large range of travel. However, since the flexible post is not rigid it is particularly susceptible to vibrations which cause the fixed mirror to move out of the desired position. When the interferometer is subject to externally applied forces this movement results in what is referred to as "baseline whip" in the collected Fourier Transform spectra. It is also generally understood that various other artifacts may also contribute to baseline whip such as what are generally referred to as laser position errors or mirror tilt. Further, it is typical to apply what is referred to as a "baseline correction" process to address some degree of baseline whip error, however typical baseline correction algorithms are incapable of removing significant baseline whip effects.

Figure 3:
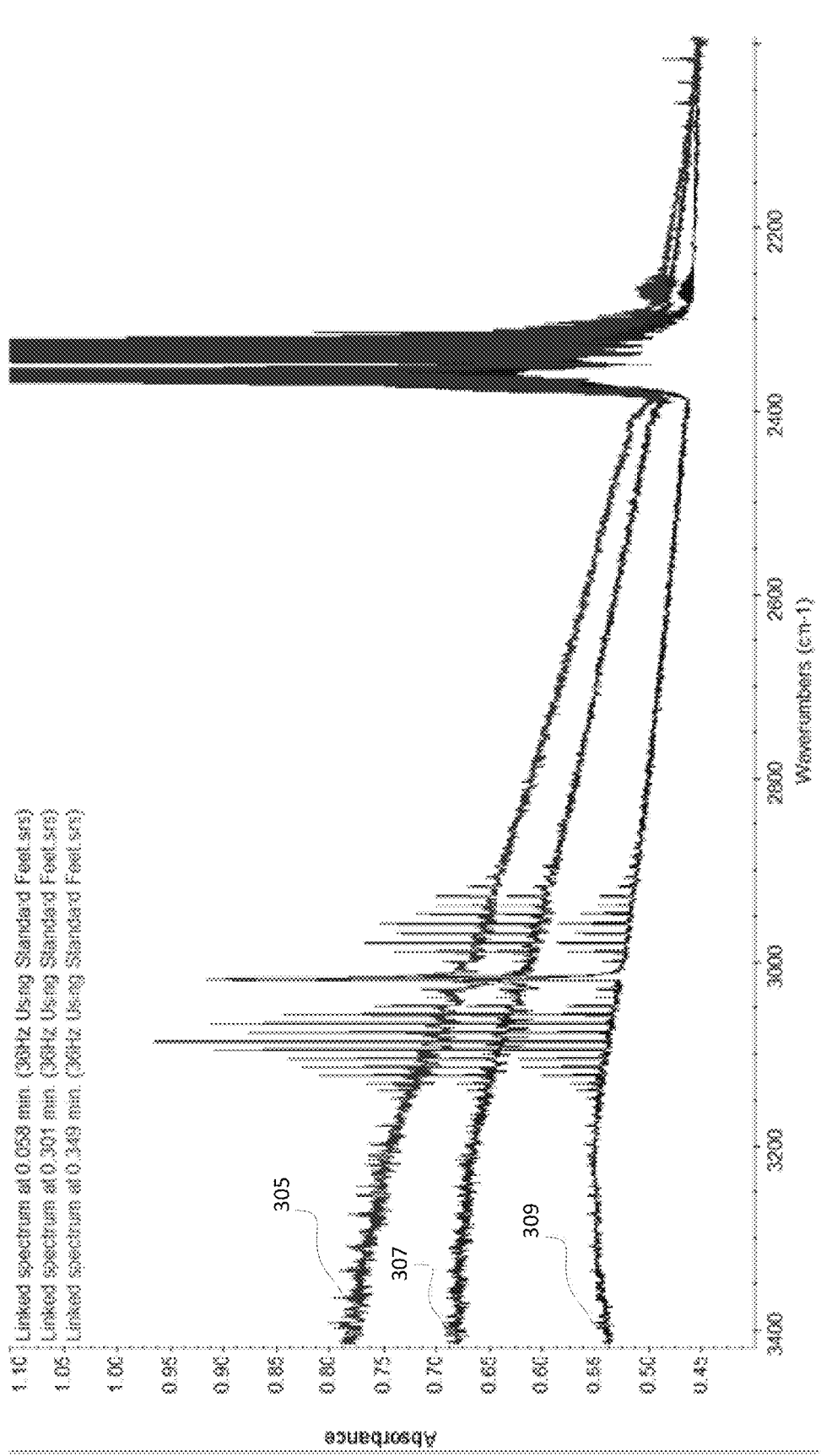
FIG. 3 is a simplified graphical representation of data illustrating the effect of "baseline whip"

FIG. 3 provides an illustrative example of undesirable baseline whip in collected spectra at three time points (e.g. line 309 at 0.058 min; line 307 at 0.301 min; and line 305 at 0.349 min) from a standard interferometer embodiment measuring a constant amount of methane in a fluid and subject to a degree of vibration (e.g. 36 Hz). In the absence of the baseline whip caused by externally applied forces the spectra should fall very cleanly on top of each other, however as illustrated in FIG. 3 the spectra are very different from one another due to the degree of baseline whip at each time point. Also, while it may appear that the degree of baseline whip increases over time, this may not necessarily be the case because base line whip may exhibit erratic and random patterns.

In one embodiment of the invention, one or more of tuning elements 217 comprise what are referred to as a "piezo actuator" (also sometimes referred to as a "piezo stack"). The piezoelectric effect is a known characteristic of certain materials where an otherwise rigid material responds to an applied voltage causing the material to elongate by a small amount. It will also be appreciated that piezo actuator technology is relatively simple to incorporate and operate with the additional benefit of being reasonably inexpensive. Therefore, due to the rigid nature of the material one or more piezo actuators of tuning elements 217 provide a very rigid and stable mounting interface for fixed mirror 207 that is substantially resistant to the effects from externally applied forces. Further, the one or more piezo actuators of tuning elements 217 may be under operational direction of a control system that may include a servo control system (e.g. may be substantially identical to servo control 203) or computer 110 which provides the desired dynamic alignment control of fixed mirror 207. For example, the one or more piezo actuators of tuning elements 217 provide significant resistance to a variety of vibrations and perform in a substantially similar manner to a rigidly mounted fixed mirror (e.g. a fixed mirror directly mounted to end plate 225 without tuning elements). However, the one or more piezo actuators of tuning elements 217 also provide a sufficient range of travel to make the necessary corrections that enable effective dynamic alignment. In the same or alternative embodiment, tuning elements 217 may comprise one or more mechanical actuators such as a stepper motor or lead screw embodiments.

Figure 4:
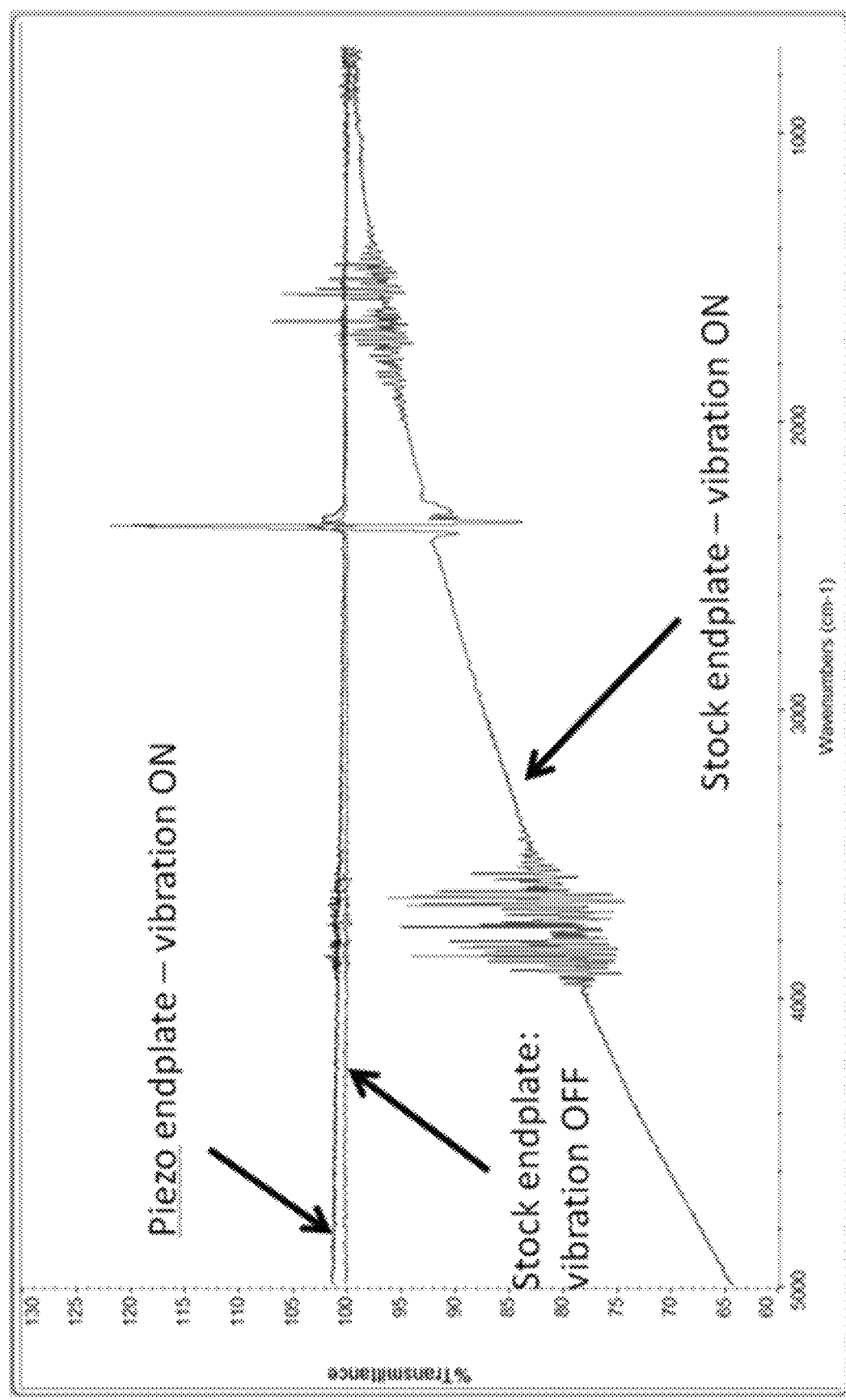
FIG. 4 is a simplified graphical representation of data illustrating an improvement using a dynamic alignment system in an embodiment of the interferometer of FIG. 2.

FIG. 4 provides an illustrative example of transmittance data collected using an embodiment of interferometer 120 comprising a configuration with a plurality of piezo actuators and a standard interferometer embodiment (e.g. "stock") comprising a flexible post configuration under vibration. The comparison of the data in FIG. 4 demonstrates the significant improvement in performance achieved through using the dynamic alignment system configured using the piezo actuators. This is evident by the significant reduction in detected vibration with the piezo actuator configuration that is substantially equal to a stock embodiment in the absence of any vibration.

Those of ordinary skill in the related art appreciate that piezo materials generally have a limited range of travel that may be insufficient for a long range degree of adjustment for fixed mirror 207. For instance, tuning elements 217 that employ piezo actuators may provide a range of adjustment of up to about 100 arc seconds for fixed mirror 207. Therefore in some or all of the described embodiments, interferometer 120 comprises a "coarse adjustment" alignment function that provides an additional range of adjustment for the dynamic alignment system. In the described embodiments, the coarse adjustment function may include a range of up to several thousand arc seconds and may, in some cases, include a range measured by degrees. Importantly, the coarse adjustment function provides sufficient range that enables compensation for various amounts of correction that may be beyond the range of adjustment capability of tuning elements 217. The amount of correction needed may be the result of manufacturing tolerances, thermal drift, mechanical insult, ageing, or other factors that affect various components of interferometer 120. In the described embodiments the range of movement provided by the coarse adjustment may be additive to the range provided by tuning elements 217. For example, in some embodiments the coarse adjustment provides long range adjustment (e.g. coarse tuning) and tuning elements 217 provide small adjustments (e.g. fine tuning). Further, the coarse adjustment mechanisms also share the rigid characteristics described above to be resistant to externally applied forces. In the described embodiments, the coarse adjustment/tuning mechanisms may include one or more mechanical actuators such as manual lead-screw type elements, and/or one or more stepper motors with sufficient gear ratios. In the present example, three lead screws can effectively accomplish the coarse adjustment function.

In the embodiments described herein interferometer 120 comprises a linear bearing used for scanning moving mirror 205 back and forth along a linear path under operational control of servo control 203. In some embodiments servo control 203 may include what may be referred to as a "proportional-integral-derivative controller" (also referred to as a PID controller) that comprises a control loop feedback mechanism which can continuously calculate an error value and apply a correction. During normal operation, servo control 203 executes what is referred to as a "turnaround" mode of operation of moving mirror 205 (e.g. a mode where moving mirror 205 reverses direction), as well as what is referred to as a "steady-state" mode of operation (e.g. fixed rate of travel of moving mirror 205). For example, during the steady state mode servo control 203 holds the laser zero crossings at a constant, fixed rate. Also, as will be described in greater detail below during the turnaround mode servo control 203, uses a very brief open loop control scheme to apply a substantial force to moving mirror 205 that causes a rapid reversal in direction of moving mirror 205 from the velocity of the steady state mode. Then under closed loop control, servo control 203 accelerates moving mirror 205 until it has reached the velocity for steady state mode and continues to operate under closed loop control of servo control 203 until the next turnaround operation. This is different from a standard approach of initiating the turnaround operation by slowing moving mirror 205 to a low velocity under closed loop control prior to applying a "mild" force to reverse the direction of moving mirror 205.

Those of ordinary skill in the related art understand that a closed loop control scheme generally utilizes an active measurement of some value that is compared to a desired set point. Then, using the difference between the measured value and the set point (commonly referred to as the "error" signal), a determination is made regarding whether a change to the control parameter needs to be applied to maintain the set point. For example, servo control 203 may be set to hold the frequency of "laser crossing" of moving mirror 205 to about 130 kHz. If the detected frequency of the laser crossings occurs at about 125 kHz, servo control 203 responds by applying more voltage to the motor driving moving mirror 205. Similarly, if the detected frequency of the laser crossings occurs at about 135 kHz, servo control 203 responds by reducing the voltage to the motor driving moving mirror 205. In the present example, the amount of voltage change may be determined by servo control 203 using an equation commonly used in the field, such as:

$$\text{output}(t) = K_P * \text{error}(t) + K_I * \int_0^t \text{error}(t) dt + K_d * \frac{d\text{error}(t)}{dt}$$

In the described equation, output(t) represents time and is the output of servo control 203, and error(t) represents the instantaneous error between the set point of servo control 203 and the current state of the measured variable. In the case of servo control 203, the output is the drive voltage that moves moving mirror 205, and the current state of the measured variable is the velocity of moving mirror 205 as measured by the laser signal zero crossings. The error signal is the set point velocity minus the measured velocity. $K_p$, $K_I$, and $K_d$ are constants, and these constants are tuned for the system to provide optimal system performance. These constants are the proportional, integral, and derivative constants, respectively, that drive the control equation.

Also understood by those of ordinary skill, open loop control does not use active measurement to control the performance of a system. Those of ordinary skill in the art understand that open loop control may be designed to be simpler and faster than a closed loop control system due to the fact that the degree of force is generally preset prior to entering into open loop mode of operation (e.g. no measurement and calculations of mirror velocity are required to adjust the degree of force). Also, the transition between the open loop control mode and the closed loop control mode (and vice versa) may be specifically programmed to minimize errors that could extend the amount of time required for moving mirror 205 to attain the proper speed.

In one embodiment open loop control provided by servo control 203 may comprise application of about 2V for a duration of about 5 milliseconds to produce a substantial force of about 50-300 grams (e.g. there may be a "thermal limit" related to the maximum allowable degree of force used, where forces above the thermal limit produce an undesirable amount of heat from a drive coil that applies the substantial force). For example, a substantial force of about 100 grams may be sufficient to provide the kick while still being below the thermal limit. It will also be appreciated that the degree of force also depends on the size of interferometer 120 and the associated components, where larger embodiments require higher degrees of force and have different thermal requirements. In the described embodiments, under open loop control if there is a disturbance causing the velocity of moving mirror 205 to change, the voltage applied by servo control 203 does not change.

Typical interferometer embodiments employ a closed loop control scheme for both the steady state mode of operation (e.g. smooth, consistent velocity), as well as for a substantial portion of the turnaround mode of operation. For example, for a typical turnaround mode of operation a controller slows the moving mirror down under closed loop control until it reaches a slow velocity before turning the mirror around. At that point, the controller enters an open loop control mode to apply a small degree of force to the mirror sufficient to turn it around from the slow velocity. Then, the controller re-enters closed loop mode of control to accelerate the moving mirror back up to the desired cruise velocity after the turnaround point is determined.

Those of ordinary skill in the related art also appreciate that servo motor 203 is most susceptible to externally applied forces when moving mirror 205 is traveling at a "slow" velocity (e.g. as compared to a fast velocity in steady state mode). For example, a slow velocity may be less than or equal to about 1 cm/s, and a fast velocity may be greater than or equal to about 3 cm/s. In the present example, if interferometer 120 is shaken quickly in the same direction that moving mirror 205 is traveling, then moving mirror 205 may actually be traveling in the reverse direction for a short period of time. More specifically, if moving mirror 205 is moving in a direction of travel at a velocity of 0.4 cm/s and interferometer 120 moves in the same direction of travel at a velocity of 1 cm/s, then moving mirror 205 is actually moving at −0.6 cm/s, in reverse relative to a fixed point in space. In the present example, the reverse movement results in unusable Fourier Transformed data for that scan. The faster that moving mirror 205 is traveling, the faster that interferometer 120 must be shaken for the reverse velocity effect to occur and thus interferometer 120 is more robust at faster velocities of moving mirror 205.

In one embodiment of the described invention servo motor 203 minimizes the period of time that moving mirror travels at a slow velocity to reduce the period that interferometer 120 is susceptible to externally applied forces. For example, servo motor 203 operates in steady state mode under closed loop control as in standard interferometers. However, when the turnaround mode servo is initiated control 203 switches to an alternative open loop control system that uses a device such as a drive coil to apply a substantial degree of force to provide a "kick" to moving mirror 205 that is opposite to the direction of travel. The substantial degree of force (e.g. may include a force in the range of 50-300 grams, and more specifically may include a force of about 100 grams) is sufficient to change the direction of travel of moving mirror without first slowing from the high velocity of the steady state mode (e.g. may include a velocity of about 8.2 cm/s). In some embodiments the kick utilizes the maximum allowable force for the embodiment of drive coil, which may include the full force available for the drive coil embodiment. It is generally appreciated that different embodiments of drive coil exist with available force that may exceed the amount needed for the kick and thus the maximum allowable or full force may not be required.

In the embodiments described servo control 203 applies a preset and constant force, and monitors the velocity of moving mirror 205 during open loop operation until moving mirror 205 reverses its direction of travel. At this point, servo control 203 re-enters a closed loop steady state mode of control. In embodiments of the described invention, by using an open loop control system during the turnaround operation with the kick providing a substantial degree of force, the amount of time that moving mirror 205 is traveling at a slow velocity is substantially reduced. In other words, the open loop mode of operation as described herein enables very rapid turnaround of moving mirror 205 minimizing the amount of time required.

In some embodiments, detector 220 and computer 110 do not collect spectroscopic data during the turnaround operation. However, because the described embodiments of interferometer 120 are less susceptible to negative effects from externally applied forces due to the rapid nature of the turnaround operation and return to the high velocity of the steady state mode data collection is also less susceptible to introduction of error. For example, typical interferometer embodiments do not perform data acquisition when the moving mirror is slowing down or speeding up during the turnaround operation due to the potential errors that could be introduced. The impact to data quality is particularly evident when a slow detector such as DTGS detector is used due to changing of velocity at any time although the impacts with faster detectors such as a MCT type detector can be significantly less. In the described embodiments of the invention using a fast detector the period of data collection can be extended into the time period where the velocity of moving mirror 205 ranges between 100% down to about 30%. The extended data acquisition period results in more data with better resolution. Further, the data acquisition period can be extended through the turnaround operation which results in acquisition of data at a faster rate. A further advantage provided by the described embodiments is that the substantial degree of force used for the turnaround operation can be at the lower end of the range of force with a low loss of speed in overall data collection, and better system stability due to less vibration and less heat in the linear motor.

In the described embodiments, after the direction of travel of moving mirror 205 reverses servo control 203 provides a consistently high level of force to push moving mirror 205 until it reaches the desired cruise velocity. This may be referred to as a "hybrid" servo control system that uses closed loop control for steady state mode and a substantial degree of force, that may include a substantial maximum allowable force, for open loop control at the initiation of the turnaround mode. It is generally understood that standard control strategies cause data drop outs and require restarts at frequent intervals while driving (e.g. once every couple of minutes or so). Whereas the hybrid control employed by servo control 203 using a hybrid control scheme results in continuous operation for extended periods (e.g. at least thirty minutes) without a single dropout event.

In some embodiments, a substantially maximum allowable force turnaround mode may increase the amount of error in the apparent position of the Zero Path Difference (e.g. ZPD is a point where the maximum amount of a certain range of wavelengths of light passes through a gas cell of the interferometer to the detector; also sometimes referred to as "center burst"), resulting in a one or two data point peak hop in an interferogram. In the described embodiments, this can easily be accounted for by servo control 203 or other high-level software implemented by computer 110 that find the ZPD after the scan is completed and shifts the data by the amount of the peak hop so that ZPD is always at the same point in the data array. For standard, laboratory based, infrared (IR) instrumentation, the maximum allowable force turnaround scheme (and the resulting peak hop) would be unacceptable for most applications where the ZPD is hard to find, such as noisy data collections or FT-Raman. In addition, this type of turnaround is violent enough to negatively impact lab grade systems utilizing a slow TGS detector. In embodiments that scan fast with a MCT detector, this doesn't impact performance to the degree it does for a TGS detector. For example, for embodiments of rugged interferometer 120 precise control of where the ZPD is located is less important for accuracy of servo control 203. This is due to the fact that the ZPD is generally well defined in the described applications due to the quality of the infrared (IR) signal that is guaranteed by the gas cell that only allows certain wavelengths to pass through.

Figure 5:
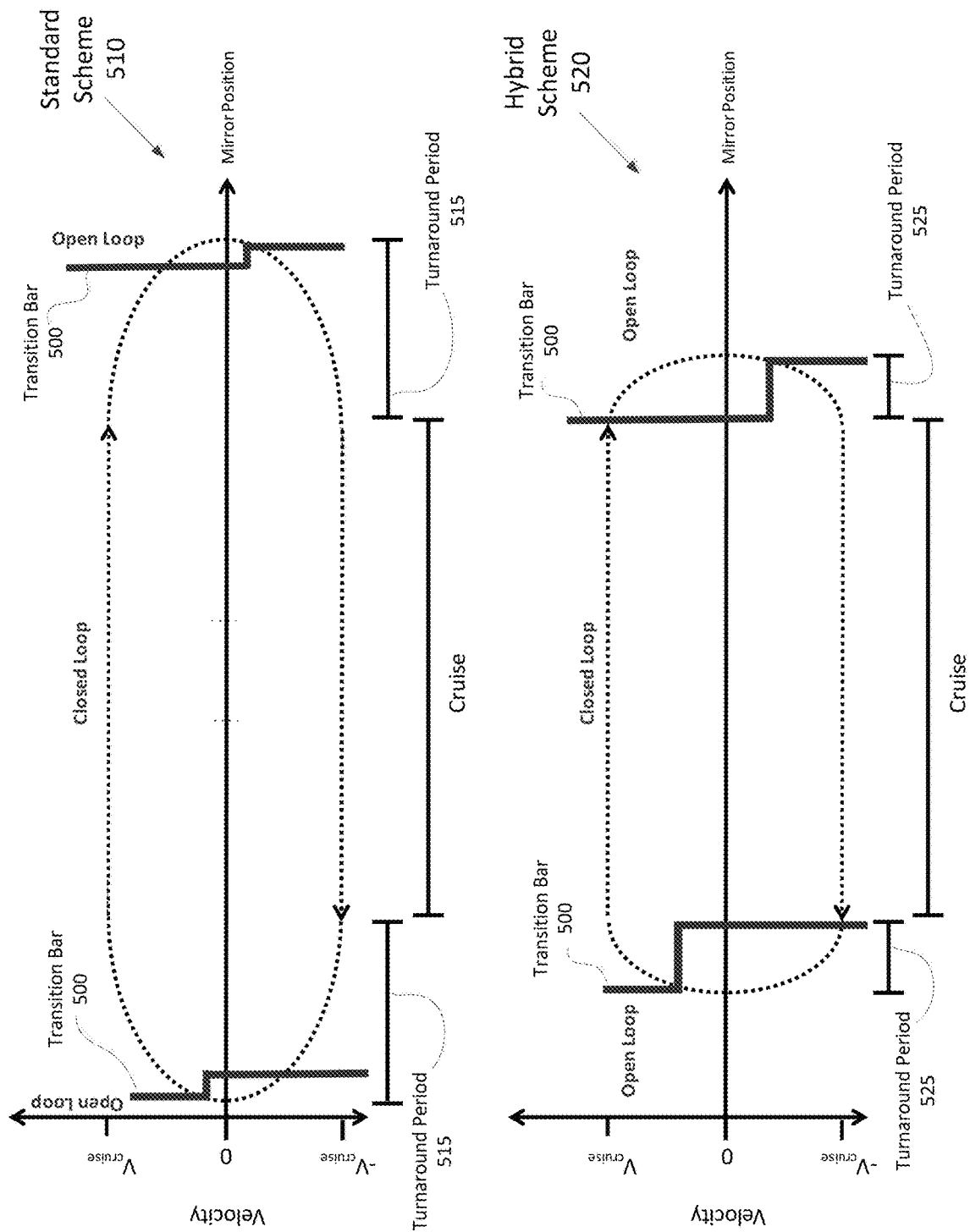
FIG. 5 is a simplified graphical representation illustrating a comparison between a standard scheme and a hybrid scheme for control of a moving mirror in an embodiment of the interferometer of FIG. 2.

FIG. 5 provides an illustrative example showing a comparison between standard scheme 510 and hybrid scheme 520 for control, where the x axis is the relative position of moving mirror 205, and they axis is the relative velocity of moving mirror 205. Importantly, as described above moving mirror 205 travels linearly (e.g. using a linear bearing) and the elliptical lines illustrated in FIG. 5 demonstrate changes in velocity rather than path of travel. In standard scheme 510, the majority of the initial turnaround period is still under closed loop control, until moving mirror 205 reaches a very slow velocity (e.g. less than about 1 cm/s). At the very slow velocity, there is a transition to a period of open loop control (e.g. indicated by transition bar 500) when servo control 203 provides a small degree of force to moving mirror 205 to turn it around, followed by a another transition to a period of closed loop acceleration that brings moving mirror 205 to steady state velocity (e.g. illustrated as $V_{cruise}$ in FIG. 5). The period of time for the entire turnaround operation under standard scheme 510 is indicated as turnaround period 515.

In hybrid scheme 520, servo control 203 does not slow the velocity of moving mirror 205 prior to the initiation the turnaround period. Instead, at the initiation of the turnaround period servo control 203 transitions to open loop control while moving mirror 205 is at the steady state velocity (e.g. indicated by transition bar 500) and applies a substantial force to moving mirror 205 that is opposite to the direction of travel (e.g. a force of 50-300 grams). Then after the direction of travel of moving mirror 205 has reversed servo control 203 transitions to closed loop control (e.g. indicated by transition bar 500) and maintains the application of the substantial force. The period of time for the entire turnaround operation under hybrid scheme 520 is indicated as turnaround period 525 that is substantially shorter than turnaround period 515. It will also be appreciated that in some embodiments moving mirror 205 is kicked at a substantially maximum allowable force for hybrid scheme 520, that results in a more substantially shortened turnaround time (and distance) when compared to turnaround period 515. In both standard scheme 510 and hybrid scheme 520, the closed loop control for the steady state portion remains the same.

Also, some embodiments of interferometer 120 include a motion detector such as an accelerometer to help determine the degree of force to apply when the system is under open loop control. Incorporation of one or more embodiments of an accelerometer (e.g. a 3 axis accelerometer or a 6 axis accelerometer) provides substantial improvements for resistance to externally applied forces of interferometer 120 by providing servo control 203 with additional data from the movement of particular elements. In embodiments that employ a TGS detector accelerometer inputs are especially useful due to relatively slower scan rates where the detector is more sensitive to velocity errors of moving mirror 205 (e.g. as compared to scan rates employed by an MCT detector). It will also be appreciated that some functions of the motion detector could be performed by another technology such as what is referred to as "Quadrature", however accelerometer embodiments provide a substantial cost benefit over such technologies while delivering a substantially equal level of performance. For example, an embodiment of accelerometer that could be used with the currently described inventions may be obtained for about ten times less the cost of a Quadrature embodiment with similar performance characteristics.

As described above externally applied forces to interferometer 120 will apply a force to moving mirror 205 in one direction or the other (e.g. according to the direction of the externally applied force) and servo control 203 uses a preset degree of force to apply to moving mirror 205 to cause it to move in one direction or the other. However, in some embodiments a motion detector can enable servo control 203 to adjust the preset amount of force applied to the moving mirror during a period of open loop operation, and therefore achieve better levels of performance. For example, an embodiment of an accelerometer may be positioned on a non-moving area of the body of interferometer 120 that measures forces enacted on interferometer 120. Servo control 203 receives the accelerometer output and sums the values that correspond to forces acting in the same direction of travel of moving mirror 205, and then multiplies the summed value by a gain factor, that may be frequency (e.g. scan speed) dependent, to generate an acceleration compensation value that servo control 203 can input into the voltage output of a coil driver that provides the force to moving mirror 205. In the presently described example, the accelerometer strategy has as minimal delay period that enables prediction of data acquisition disruptions before they occur.

In the same or alternative example, an additional embodiment of an accelerometer (e.g. either a 3 axis or a 6 axis) could be positioned on an area of end plate 225 whose output could be treated in the same manner as the output from the body accelerometer (e.g. summation and gain multiplication) for use with the voltage output into tuning elements 217. In some implementations, the use of accelerometer could replace the piezo embodiments of tuning elements 217 to further reduce costs. Also, in some cases where rotational forces acting on interferometer 120 are a concern the use of a 6 axis embodiment of accelerometer provides advantages over a 3 axis embodiment.

Further, some embodiments of interferometer 120 may utilize a position sensor (e.g. a photoswitch or encoder) to identify the position of moving mirror 205. Alternatively, some of the embodiments of the invention described herein utilize a motion detector in place of specific position sensor to provide servo control 203 with the absolute position of moving mirror 205 at a given time. In the described embodiments it is important for servo control 203 to know the position of moving mirror 205 to initiate travel for a scanning operation. For example, a startup scheme may force moving mirror 205 under open loop control up against a hard stop at the end of the range of travel of a linear bearing. The scan is launched from this position so that at all times servo control 203 has the position of moving mirror 205 relative to the known location (e.g. the end of the bearing that it launched from). If there is any disruption that requires servo control 203 to restart, the procedure is repeated. An externally applied force to interferometer 120 (e.g. via vibration and/or tilt) in the direction of travel of moving mirror 205, may alter the position of moving mirror 205 from the known location (e.g. moving mirror 205 may slide along the linear bearing due to a very low coefficient of friction), which can cause the startup procedure to fail. By incorporating an accelerometer into the open loop control operation, servo control 203 is able to apply the necessary force to hold moving mirror 205 at the known position before launching the first scan. In the present example, this enables reliable start up when interferometer 120 experiences 17 degrees of tilt angle or more.

In the same or alternative embodiments, an accelerometer can also be used to feed into the substantial force open loop turnaround operation as well. For example, if interferometer 120 is tilted or otherwise being accelerated, servo control 203 can compensate for the tilt by kicking moving mirror 205 at a slightly higher or slightly lower force, depending on the tilt angle measured by the accelerometer resulting in increased reliability of ZPD positioning (e.g. making peak hops less extreme). Lastly, an accelerometer may be employed as a reporting tool to set vibration specification limits, and tag any spectra that were collected in a vibration environment outside of instrument specifications. This would provide a significant benefit by identifying data that may be inaccurate as well as identifying what types of vibration conditions interferometer 120 has experienced.

Importantly, embodiments of the invention described herein produce results similar to those obtained under controlled laboratory conditions while experiencing externally applied forces such as significant vibrations and tilt (e.g. the back of a car driving down the road). For example, interferometer 120 can perform high speed gas analysis, at 0.5 cm−1 resolution, over a period of at least 30 minutes of continuous operation without interruption caused by vibration and/or tilt. In the present example, interferometer 120 produces a substantially constant measurement of an amount of gas contained in a sealed gas cell while driving (e.g. a test of how precise the instrument is while driving).

Figure 6:
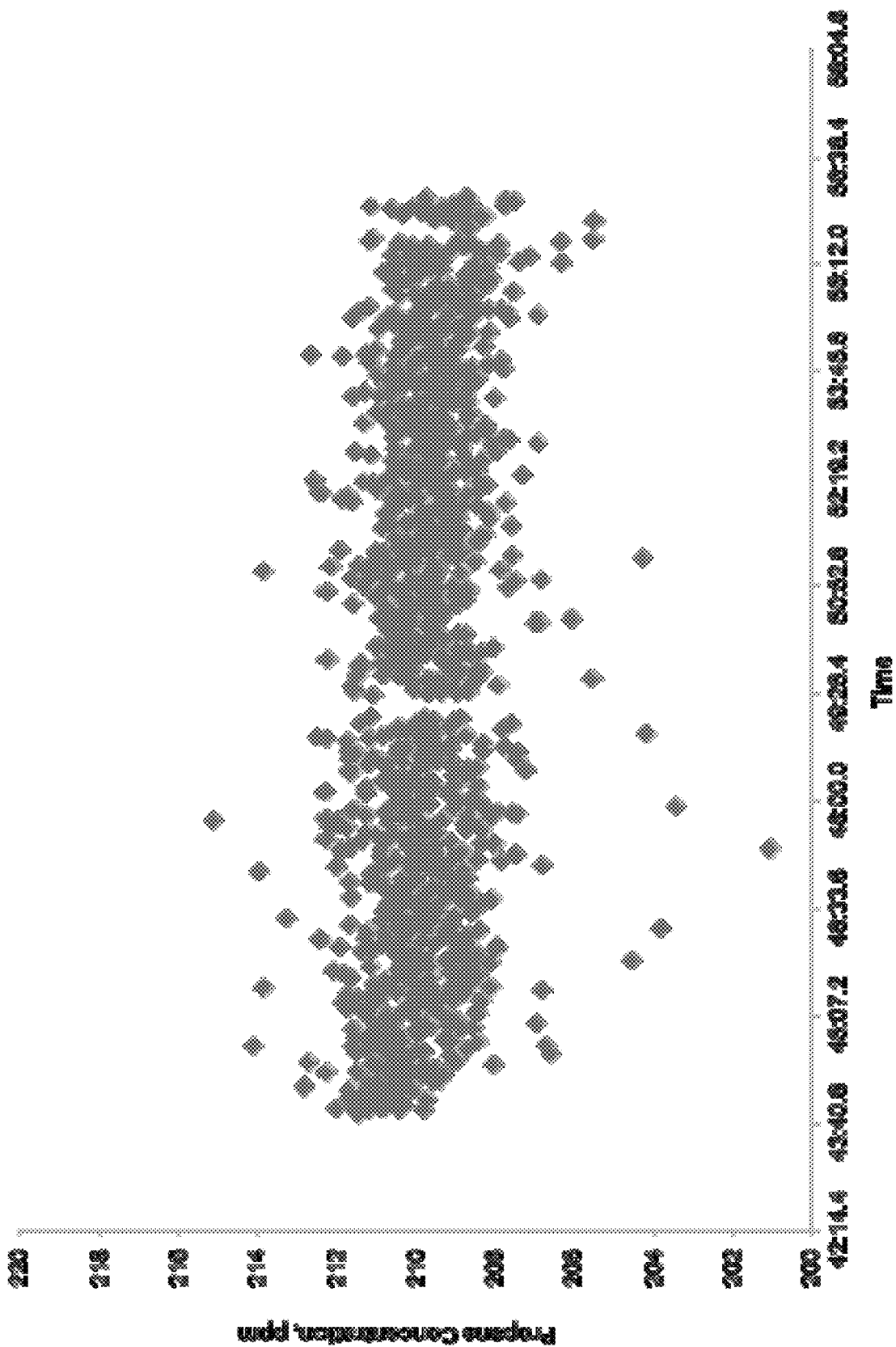
FIG. 6 is a simplified graphical representation of data illustrating performance of an embodiment of the interferometer of FIG. 2 that shows the measured concentration of propane gas over time while in motion in a vehicle.
Figure 7:
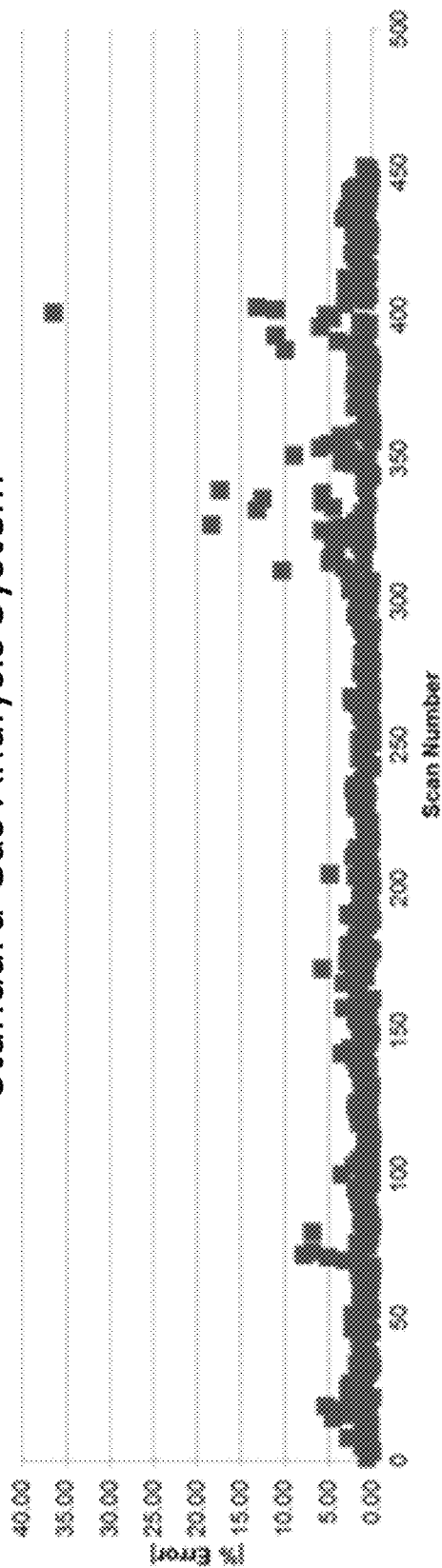
FIG. 7 is a simplified graphical representation of data illustrating a comparison of quantification error between a standard gas analysis instrument and an embodiment of the interferometer of FIG. 2.
Figure 7:
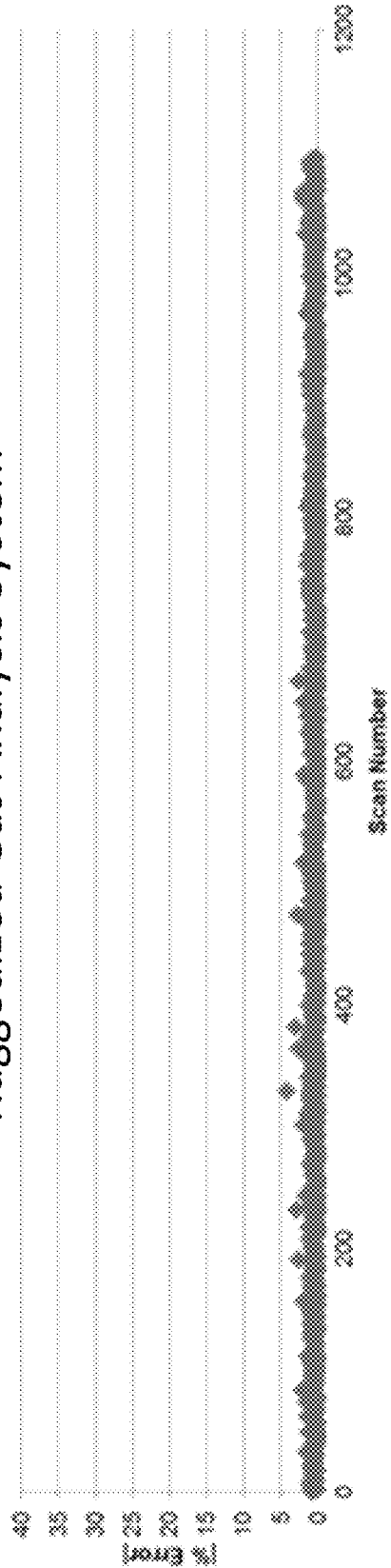

FIGS. 6 and 7 provide illustrative examples of results demonstrating interferometer 120's performance quantifying the concentration of a gas while in motion in a vehicle. In the example of FIG. 6, interferometer 120 was mounted in the back of a vehicle, and set to perform a real time quantification of propane gas in a 2 m gas cell filled with 210 ppm of the propane gas while driving down the road. The maximum deviation from the average was a deviation of 4% and over 90% of the data points are within 1% of the average value. FIG. 7 provides a comparison of quantification error between a standard gas analysis instrument (e.g. such as the iG50 instrument available from Thermo Fisher Scientific) and a ruggedized embodiment of interferometer 120 that employs the dynamic alignment system with tuning elements 217 that employ piezo actuators as well as hybrid scheme 520. It is notable that the standard gas analysis instrument contains a number of outliers in error plot detected from a gas cell filled with 100 ppm of methane gas. Alternatively, the gas cell used for testing the ruggedized version of interferometer 120 was filled with 210 ppm of propane gas. Both data sets were collected with the instrument mounted in the back of a car while driving, % error was calculated by taking the absolute value of the subtraction between each value and the average value, then by dividing this residual by the average value and multiplying by 100.

Lastly, the form factor of interferometer 120 is important for continuous emission monitoring, portable emissions monitoring, and Real Time Driving Emissions measurements. For these applications, spectrometers are picked up and carried around quite frequently, or they are installed in remote places. In either case, a small form factor is important for transportability. For example, embodiments of interferometer 120 may comprise a form factor with dimensions of: 490 mm×250 mm×330 mm, and a maximum weight of 15 kg, and in some cases it is desirable to have a form factor of 350 mm×230 mm×280 mm and a weight at 14 kg. Those of ordinary skill in the related art will appreciate that it is an easier challenge to make a larger, heavier interferometer resistant to vibrations, because the larger the mass of an object, the less susceptible it is to vibrations.

Having described various embodiments and implementations, it should be apparent to those skilled in the relevant art that the foregoing is illustrative only and not limiting, having been presented by way of example only. Many other schemes for distributing functions among the various functional elements of the illustrated embodiments are possible. The functions of any element may be carried out in various ways in alternative embodiments.

What is claimed is:

1. A ruggedized interferometer, comprising:
    a light source that generates a beam of light;
    a fixed mirror;
    a moving mirror that travels along a linear path;
    a drive coil;
    a beam splitter that directs a first portion of the beam of light to the fixed mirror and a second portion of the beam of light to the moving mirror, wherein the beam splitter recombines the first portion reflected from the fixed mirror and the second portion reflected from the moving mirror; and
    a servo control that at initiation of a turnaround period employs the drive coil to apply a substantial degree of force of about 50-300 grams to the moving mirror traveling at a steady state velocity that is greater or equal to 3 cm/s, wherein the substantial degree of force reverses the direction of travel of the moving mirror and the servo control maintains the application of the substantial degree of force until the moving mirror reaches the steady state velocity.

2. The ruggedized interferometer of claim 1, wherein:
    the servo control employs a hybrid control scheme to switch from closed loop control to open loop control at the initiation of the turnaround period and to switch from open loop control to closed loop control upon reversal of the direction of travel of the moving mirror.

3. The ruggedized interferometer of claim 2, wherein:
    the servo control employs the drive coil to apply a force to the moving mirror to maintain the steady state velocity under closed loop control.

4. The ruggedized interferometer of claim 1, wherein:
    the fixed mirror further comprises a dynamic alignment system comprising one or more tuning elements with rigid characteristics.

5. The ruggedized interferometer of claim 4, wherein:
    the one or more tuning elements comprise a piezo actuator.

6. The ruggedized interferometer of claim 4, wherein:
the one or more tuning elements comprise a mechanical actuator.

7. The ruggedized interferometer of claim 4, wherein:
the dynamic alignment system further comprises a coarse tuning mechanism with rigid characteristics.

8. The ruggedized interferometer of claim 7, wherein:
the coarse tuning mechanism comprises a lead screw or a stepper motor.

9. The ruggedized interferometer of claim 7, wherein:
the tuning elements and coarse tuning mechanism provide an additive range of compensation.

10. The ruggedized interferometer of claim 1, further comprising:
a motion detector that measures forces enacted on the ruggedized interferometer positioned on a non-moving portion of a body of the ruggedized interferometer and that provides information to the servo control to modify an amount of the substantial degree of force applied to the moving mirror.

11. The ruggedized interferometer of claim 10, wherein:
the motion detector comprises an accelerometer.

12. The ruggedized interferometer of claim 1, further comprising:
a motion detector that measures forces enacted on the ruggedized interferometer positioned on an end plate and that provides information to make a positional adjustment to the fixed mirror.

13. The ruggedized interferometer of claim 1, further comprising:
a detector.

14. The ruggedized interferometer of claim 13, wherein:
the detector comprises a fast detector.

15. The ruggedized interferometer of claim 14, wherein:
the fast detector comprises a mercury cadmium telluride (MCT) detector.

16. The ruggedized interferometer of claim 13, wherein:
the detector comprises a slow detector.

17. The ruggedized interferometer of claim 16, wherein:
the slow detector comprises a triglycine sulfate (TGS) detector.

18. The ruggedized interferometer of claim 1, further comprising:
one or more shock absorbing structures.

19. The ruggedized interferometer of claim 18, wherein:
the one or more shock absorbing structure comprise rubber feet.

20. The ruggedized interferometer of claim 18, wherein:
the one or more shock absorbing structure comprise wire rope isolators.

21. The ruggedized interferometer of claim 1, wherein:
the substantial degree of force comprises a maximum allowable force.

22. The ruggedized interferometer of claim 1, wherein:
the substantial degree of force comprises a force of about 100 grams.

23. The ruggedized interferometer of claim 1, wherein:
the high velocity comprises a velocity of about 8.2 cm/s.

24. The ruggedized interferometer of claim 12, wherein:
the motion detector comprises an accelerometer.

* * * * *